Figure 1:
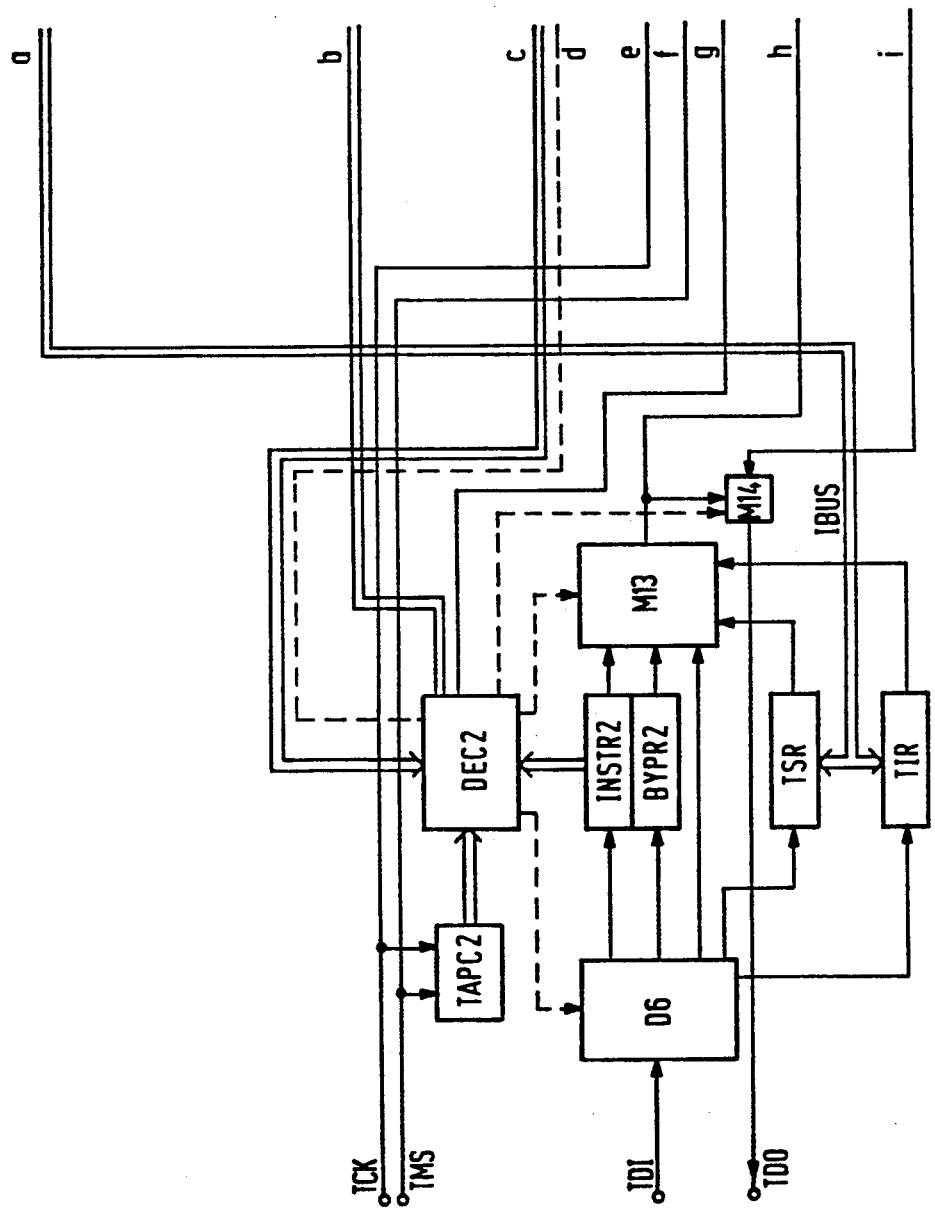

United States Patent [19]

Burchard

[11] Patent Number: 5,222,068
[45] Date of Patent: Jun. 22, 1993

[54] PROCESSOR CIRCUIT

[75] Inventor: Bernd Burchard, Essen, Fed. Rep. of Germany

[73] Assignee: Siemens Aktiengesellschaft, Munich, Fed. Rep. of Germany

[21] Appl. No.: 851,475

[22] Filed: Mar. 13, 1992

[30] Foreign Application Priority Data

Mar. 13, 1991 [EP] European Pat. Off. ......... 91103867.7

[51] Int. Cl.[5] ............................................. G01R 31/28
[52] U.S. Cl. ................................. 371/22.3; 371/25.1
[58] Field of Search ............... 395/500, 575; 371/21.2, 371/22.1, 22.3, 22.4, 22.5, 22.6, 25.1; 324/158 R

[56] References Cited

U.S. PATENT DOCUMENTS 5,084,874  1/1992  Whetsel, Jr. ..................... 371/22.3
5,150,044  9/1992  Hashizume et al. ............. 371/22.3
5,155,432 10/1992  Mahoney ......................... 371/22.3

OTHER PUBLICATIONS

Proceedings IEEE International Conference on Computer Design, Oct. 2-4, 1989; pp. 580-584, Zorian et al.
Ire Wescon Convention Record, Book 32, Nov. 1988, North Hollywood US, pp. 1-6, Davidson.
Electro, Book 15, May 11, 1990, Los Angeles US: pp. 36-41; Robinson.

*Primary Examiner*—Vincent P. Canney
*Attorney, Agent, or Firm*—Herbert L. Lerner; Laurence A. Greenberg

[57] ABSTRACT

A processor circuit includes multiplexers, demultiplexers, boundary-scan registers, register cells as well as corresponding control logic and a processor core. This permits a self-test of the componentry to which it belongs and a production test of the componentry, besides the test of the processor circuit itself, while meeting standard conditions.

7 Claims, 2 Drawing Sheets

PROCESSOR CIRCUIT

The invention relates to a processor circuit suitable for componentry self-testing.

In the future, the increasingly dense placement of components on assembly substrates in componentry will not allow electrical bonding by means of clamps or test tips for componentry testing. The possibilities for quality control and rapid error diagnosis on the spot are thus fewer. For that reason, the Joint Test Action Group (JTAG) has defined a standard test access port and a boundary-scan architecture (see IEEE Standard 1149.1/D6, Standard Test Access Port and Boundary-Scan Architecture, draft, Nov. 22, 1989).

In a circuit that meets such a standard, instructions and associated data for testing are read serially into a circuit component and read out serially, and after the instruction has been carried out the result is read out serially. The sequence of individual operations is monitored and controlled by a bus master. Functioning as a bus master is either an automatic testing device or a circuit component that is coupled to a test bus that is part of a more extensive maintenance apparatus. In the case of monitoring and controlling, test mode selection inputs and test cycle inputs of the various circuit components are connected to the bus master. Beginning at an initialization state in which the standard circuit is inactive, a defined sequence of operations is then performed.

First, in general, the instruction code of the various operations to be performed is loaded into the applicable circuit components. A test logic that meets the aforementioned standard is constructed in such a way that the shifting of the instruction words to circuit blocks that are controlled by the instruction have no influence. The instructions transmitted to the circuit blocks are changed only whenever the shift process is ended.

Once the instruction word has been loaded, the selective test circuit is activated. In some cases, however, data words have to be entered into the test circuit before any work can be done. Loading of the data words is done basically in the same way as the loading of the instruction words beforehand and the data words have no influence on the instruction words.

Next, the loaded instruction is carried out, optionally while taking the entered data into account, and the result is read out serially by shifting from the applicable circuit component to the bus master or by means of the bus master. In cases in which the instruction remains the same and only the data change, only the new data are loaded into the applicable circuit component, while at the same time the result ascertained from the previous data is read out. It is unnecessary to reload the instruction.

The capability of observing and stimulating all of the lines and circuit blocks involved is thus created, as is a simple, economical interface, for instance for automatic testing apparatus, with the possibility of remote diagnosis.

However, Rule 3.1.1 of the aforementioned standard expressly requires that the terminals of the defined test access port must not be used for other purposes. In the case of componentry with a processor, for instance, it is not possible to first have the processor stimulate the test lines for a componentry self-test and to second nevertheless carry out a production test with an external test logic over the same test bus. The stimulation in the case of a self-test would turn the input terminals to be provided on the componentry into output terminals, and vice versa.

It is accordingly an object of the invention to provide a processor circuit, which overcomes the hereinafore-mentioned disadvantages of the heretofore-known devices of this general type and which enables not only the test of the processor circuit itself but also a componentry self-test and a componentry production test, while adhering to the conditions listed in the aforementioned standard.

With the foregoing and other objects in view there is provided, in accordance with the invention, a processor circuit, comprising a processor core, a test control register connected to the processor core, an internal test clock line, an internal test mode selection line, a test controller connected to the internal test clock line and to the internal test mode selection line, an internal test data input line, a first demultiplexer having outputs and having an input connected to the internal test data input line, an instruction register having an input and an output, a bypass register having an input and an output, the inputs of the instruction register and the bypass register being connected to some of the outputs of the first demultiplexer, a decoder coupled to the instruction register, the test controller and the test control register, a multiplexer having inputs, the outputs of the instruction register and the bypass register being connected to some of the inputs of the multiplexer, a plurality of boundary-scan registers and register cells being connected in series between one of the outputs of the first demultiplexer and one of the inputs of the multiplexer, an external test clock output, an external test output, an external test input and a test mode selection output each being coupled to a respective one of the register cells, a port connected between the register cells and to the processor core, and an external test clock input, an external test mode selection input, an external test data input, an external test data output, an internal test data output line, and an additional external test mode selection input, a sequential circuit including further multiplexers and further demultiplexers, the sequential circuit being connected to the external test clock input, the external test mode selection input, the external test data input, the external test data output, the internal test data output line, the internal test clock line, the internal test mode selection line, the internal test data output line, the test controller, the first demultiplexer, the register cells, the port, the boundary-scan registers, the external test output and the external test input, in certain operating cases the sequential circuit decoupling elements in the form of the internal test clock line, the internal test mode selection line, the internal test data input line and the internal test data output line from the external test clock input, from the external test mode selection input, from the external test data input and from the external test data output, and coupling the elements to the external test clock output, to the test mode selection output, to the test input, and to the test output, and in certain operating cases the sequential circuit coupling the external test data input to the external test output, coupling the external test clock input to the external test clock output, coupling the external test input to the external test data output, and coupling the external test mode selection output to the additional external test mode selection input.

In accordance with another feature of the invention, there is provided an internal bidirectional bus, an internal processor reset line, an internal processor interrupt line and an internal processor clock line, each being connected to the processor core, the port being connected to the internal bidirectional bus and having input and output lines, a first one of the further multiplexers having one input coupled to the external test data input, another input connected to a first one of the input lines of the port, and an output side, the first demultiplexer being connected to the output side of the first multiplexer, a first one of the boundary-scan registers, the instruction register, the bypass register and a second one of the further multiplexers each having one input connected to a respective one of the outputs of the first demultiplexer, the second multiplexer having an output, the first boundary-scan register having an output side, a second demultiplexer of the further demultiplexers being connected to the output side of the first boundary-scan register, the second demultiplexer having outputs, a first register cell having a parallel input, a serial input, a parallel output and a serial output, an external clock input connected to the parallel input of the first register cell, one of the outputs of the second demultiplexer being connected to the serial input of the first register cell, the internal processor clock line being connected to the parallel output of the first register cell, a third one of the further multiplexers having one input connected to the serial output of the first register cell, another input connected to another of the outputs of the second demultiplexer and an output side, a second one of the boundary-scan registers being connected to the output side of the third multiplexer, and having an output side, a third demultiplexer of the further demultiplexers being connected to the output side of the second boundary-scan register, the third demultiplexer having outputs, an external bidirectional bus, a third one of the boundary-scan registers connected to one of the outputs of the third demultiplexer, to the external bidirectional bus and to the internal bidirectional bus, the third boundary-scan register having an output, a fourth one of the further multiplexers having one input connected to a further output of the third demultiplexer, another input connected to the output of the third boundary-scan register, and an output side, a fourth one of the boundary-scan registers connected to the output side of the fourth multiplexer, the fourth boundary-scan register having an output side, a fourth demultiplexer of the further demultiplexers being connected to the output side of the fourth boundary-scan register, the fourth demultiplexer having outputs, a second register cell having a parallel input connected to the additional external test mode selection input, a serial input connected to one of the outputs of the fourth demultiplexer, a serial output, and a parallel output, a fifth demultiplexer of the further demultiplexers being connected to the serial output of the second register cell, the fifth demultiplexer having a serial output and a further output, a fifth one of the further multiplexers having one input coupled to the serial output of the fifth demultiplexer, another input coupled to the internal test data output line, and an output, a third register cell having a serial input connected to the output of the fifth multiplexer, a parallel output connected to the external test output, a parallel input connected to the output of the second multiplexer and a serial output, the second multiplexer having an input connected to a first one of the output lines of the port, a fourth register cell having a serial input connected to a second one of the input lines of the port and to the serial output of the third register cell, a parallel output connected to the external test mode selection output, a serial output, and a parallel input, a fifth register cell having a serial input connected to the serial output of the fourth register cell, a parallel output connected to the external test clock output, and a parallel input and a serial output, a sixth one of the further multiplexers having one input connected to the external test output, another input connected to the external test input, and an output, a sixth register cell having a serial input connected to the serial output of the fifth register cell, a parallel input connected to the output of the sixth multiplexer, and a parallel output connected to the first input line of the port, and a serial output, a ninth one of the further multiplexers having inputs being respectively connected to the serial output of the sixth register cell, to a further one of the outputs of the fourth demultiplexer, and to the further output of the fifth demultiplexer, and the ninth multiplexer having an output side, a seventh one of the further multiplexers having one input connected to the parallel output of the second register cell, another input connected to a second one of the output lines of the port, and an output connected to the parallel input of the fourth register cell, an eighth one of the further multiplexers having one input connected to the external test clock input, another input connected to a third one of the output lines of the port, and an output connected to the parallel input of the fifth register cell, a fifth one of the boundary-scan registers connected to the output side of the ninth multiplexer, the fifth boundary-scan register having an output, a tenth one of the further multiplexers having inputs being respectively connected to the first input line of the port, to the output of the fifth boundary-scan register, to the output of the instruction register, and to the output of the bypass register, and the tenth multiplexer having an output connected to the internal test data output line, an eleventh one of the further multiplexers having one input connected to the external test mode selection input, another input connected to the output of the seventh multiplexer, and an output, a twelfth one of the further multiplexers having one input connected to the external test clock input, another input connected to the output of the eighth multiplexer, and an output, the test controller having one input connected through the internal test mode line to the output of the eleventh multiplexer, another input connected through the internal test clock line to the output of the twelfth multiplexer, and an output, the test control register having an output, and unidirectional bus lines connecting the decoder to the outputs of the test control register, the test controller and the instruction register, for triggering the demultiplexers, the multiplexers, the boundary-scan registers, and the register cells.

In accordance with a further feature of the invention, there is provided a sixth demultiplexer of the further demultiplexers having an input connected to the external test data input and a thirteenth one of the further multiplexers being connected to the sixth demultiplexer and having an output connected to the one input of the first multiplexer, for coupling together the external test data input and the one input of the first multiplexer, the thirteenth multiplexer having inputs and an output, and the sixth demultiplexer having outputs, one of the outputs of the sixth demultiplexer being directly connected to one of the inputs of the thirteenth multiplexer, a further instruction register, a further bypass register, a test status register and a test information register each being connected between a respective one of the outputs of the sixth demultiplexer and a respective one of the inputs of the thirteenth multiplexer, the test status register and the test information register being additionally connected to the internal bidirectional bus, a further test controller having one input connected to the external test clock input and another input connected to the external test mode selection input, a further decoder having inputs and outputs, unidirectional bus lines connecting the inputs of the further decoder to the further instruction register, to the further test controller and to the test control register, the outputs of the further decoder being connected to the internal processor reset line, to the internal processor interrupt line and to the internal test logic reset line, and a fourteenth one of the further multiplexers being connected between the internal test data output line and the internal test data output line, the fourteenth multiplexer having one input connected to the internal test data output line, another input connected to the output of the thirteenth multiplexer, and an output connected to the external test data output.

In accordance with an added feature of the invention, there are provided control lines connecting the further decoder to the first-mentioned decoder as well as to the thirteenth and fourteenth multiplexers and to the sixth demultiplexer.

In accordance with an additional feature of the invention, there is provided an internal data and program memory connected to the internal bidirectional bus.

In accordance with yet another feature of the invention, the first demultiplexer has a further output, the tenth multiplexer has a further input, and there is provided a manufacturer register connected between the further output of the first demultiplexer and the further input of the tenth multiplexer.

In accordance with a concomitant feature of the invention, the contents of the first-mentioned instruction register have a lower priority than those of the test control register, and the contents of the test control register in turn have a lower priority than those of the further instruction register.

Other features which are considered as characteristic for the invention are set forth in the appended claims.

Although the invention is illustrated and described herein as embodied in a processor circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

Figure 2:
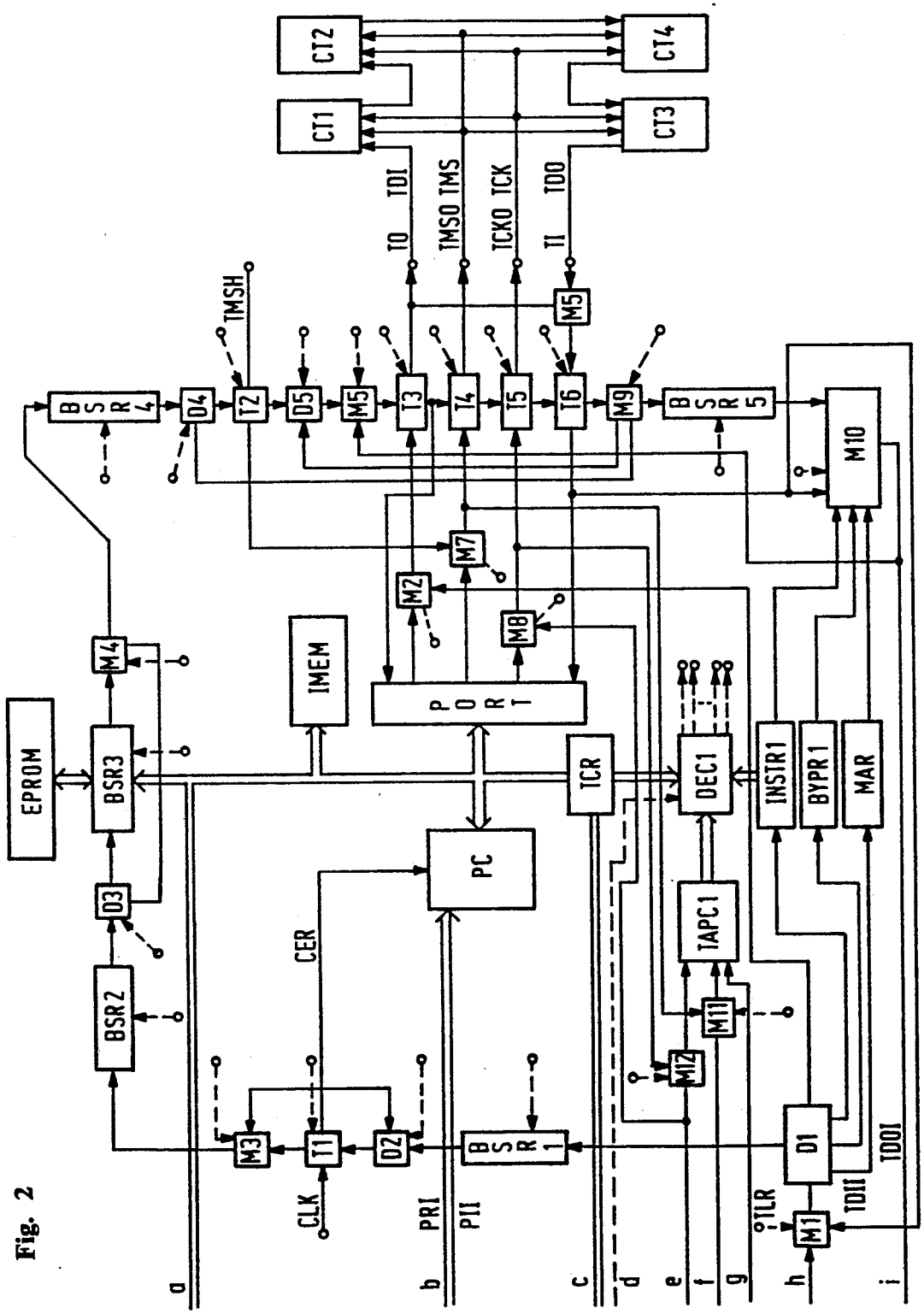

Referring now FIGS. 1 and 2 of the drawing in detail as a whole, there is seen a processor circuit according to the invention which has, for instance, one demultiplexer D6, with an input that is connected to an external test data input TDI. Inputs of an instruction register INSTR2, a bypass register BYPR2, a test status register TSR and a test information register TIR, are each connected to a respective output of the demultiplexer D6. The test status register TSR and the test information register TIR are additionally coupled to an internal bidirectional bus IBUS. Outputs of the instruction register INSTR2, the bypass register BYPR2, the test status register TSR and the test information register TIR are each carried to a respective input of a multiplexer M13. A further input of the multiplexer M13 is also connected to one output of the demultiplexer D6. A multiplexer M14 is coupled on the input side firstly to the output of the multiplexer M13 and secondly to an internal test data output line TDOI. An output of the multiplexer M14 is connected to an external test data output TDO.

A test controller TAPC2 which is also provided has one input connected to an external test mode selection input TMS and another input connected to an external test clock input TCK. A test control register TCR which is also provided is connected to the internal bidirectional bus IBUS. A decoder DEC2 is connected through internal unidirectional bus lines both to an output of the test control register TCR and to outputs of the test controller TAPC2 and the instruction register INSTR2. Outputs of the decoder DEC2 are connected to an internal processor reset line PRI, an internal processor interrupt line PII and a test logic reset line TLR.

In addition to the test status register TSR, the test information register TIR and the test control register TCR, the following elements are all coupled to the internal bidirectional bus IBUS: an internal memory IMEM, a port PORT having a plurality of input and output lines and a processor core PC, wherein the processor core is additionally connected to the internal processor reset line PRI, the internal processor interrupt line PII, and the internal processor clock line CER. The internal memory IMEM is provided for holding the processor program and for holding data and can be constructed as both a volatile and a non-volatile memory.

A multiplexer M1 which is also provided has one input connected to an output of the multiplexer M13 and another input connected to a first input line of the port PORT. An output of the multiplexer M1 is carried through an internal test data input line TDII to an input of a demultiplexer D1. A serial input of a boundary-scan register BSR1, an instruction register INSTR1, a bypass register BYPR1, a manufacturer register MAR and a multiplexer M2, are connected to outputs of the demultiplexer D1. A demultiplexer D2 is connected to the output side of the boundary-scan register BSR1. An output of the demultiplexer D2 is connected to a serial input of a register cell T1, while a parallel input is connected to an external clock input CLK. Another output of the demultiplexer D2 is carried to one input of a multiplexer M3. Another input of the multiplexer M3 is connected to a serial output of the memory cell T1. Connected to the output side of the multiplexer M3 is a boundary-scan register BSR2, which is turn is followed by a demultiplexer D3. Connected to one output of the demultiplexer D3 is a boundary-scan register BSR3, which has a serial output that is in turn carried to a multiplexer M4. Another input of the multiplexer M4 is connected to another output of the demultiplexer D3. In addition to the serial input and output, a parallel access is also possible for the boundary-scan register BSR3 in the exemplary embodiment. To this end, the boundary-scan register BSR3 is connected on one hand to the internal bidirectional bus IBUS and on the other hand to an external bidirectional bus EBUS. Both buses are provided in this case for transmitting data, addresses and control signals in both directions. The multiplexer M4 is adjoined by a boundary-scan register BSR4. The boundary-scan register BSR4 is followed by a demultiplexer D4. One output of the demultiplexer D4 is carried to one serial input of a register cell T2. The register cell T2 has a parallel input which is connected to an additional external test mode select input TMSH. A serial output of the register cell T2 is followed by a demultiplexer D5. One output of the demultiplexer D5 is connected to one input of a multiplexer M5. Another input of the multiplexer M5 is connected to the internal test data output line TDOI.

A register cell T3 has a serial input connected to an output of the multiplexer M5. A parallel output of the register cell T3 is respectively connected to an external test output TO. A serial output of this cell T3 is connected to a second input line of the port PORT. Following the register cell T3 is a register cell T4 having a serial input connected to a serial output of the register cell T3 and a parallel output connected to an external test mode selection output TMSO. Following the register cell T4 is a register cell T5 having a serial input connected to a serial output of the register cell T4 and a parallel output connected to an external test clock output TCKO. The parallel output of the register cell T3 is also connected to one input of a multiplexer M6 having another input connected to an external test input TI. A register cell T6 is coupled through a serial input to a serial output of the register cell T5 and through a parallel input to an output of the multiplexer M6. The register cell T6 has a parallel output connected to the first input line of the port PORT.

The multiplexer M2 has one input connected to a first output line of the port PORT and another input connected to a further output of the demultiplexer D1. An output of the multiplexer M2 is connected to a parallel input of the register cell T3. A multiplexer M7 and a multiplexer M8 are also provided. One input of the multiplexer M7 is connected to a second output line of the port PORT, another input thereof is connected to a parallel output of the register cell T2 and an output thereof is coupled to a parallel input of the register cell T4. One input of the multiplexer M8 is connected to a third output line of the port PORT, another input thereof is connected to the external test clock input TCK and an output thereof is connected to a parallel input of the register cell T5. A serial output of the register cell T6 is carried to one input of a multiplexer M9 having further inputs which are each connected to a respective different output of the demultiplexers D4 and D5. A boundary-scan register BSR5 is connected to the output side of the multiplexer M9. An output of the boundary-scan register BSR5 is carried to a multiplexer M10, having further inputs which are respectively connected to outputs of the instruction register INSTR1, the bypass register BYPR1 and the manufacturer register MAR and to the first input line of the port PORT. An output of the multiplexer M10 is connected to the internal test data output line TDOI.

Finally, the processor circuit shown includes a multiplexer M12 having one input connected to the external test clock input TCK and another input connected to the output of the multiplexer M8. A test controller TAPC1 has one input connected through an internal test mode selection line TMS1 to one output of a multiplexer M11, another input connected through an internal test clock line TCKI to the output of the multiplexer M12 and an input connected to the test logic reset line TLR. The multiplexer M11 has one input connected to the external test mode selection input TMS and another input connected to the output of the multiplexer M7. A decoder DEC1, which is connected through internal unidirectional bus lines to outputs of the test control register TCR, the test controller TAPC1 and the instruction register INSTR1, controls each of the demultiplexers D1-D5, the multiplexers M1-M12, the boundary-scan registers BSR1-BSR5 and the register cells T1-T6, through control lines. The decoder DEC1 is connected to the decoder DEC2 through a control line. The decoder DEC2 controls the multiplexers M13 and M14 and the demultiplexer D6, again through corresponding control lines.

The processor circuit according to the invention is assumed to be part of a set of components which, for example, includes a non-volatile memory EPROM and further circuit parts CT1-CT4. The external test clock input TCK, the external test mode selection input TMS, the external test data input TDI and the external test data output TDO of the processor circuit are provided as an interface of the set of components. The corresponding external inputs of the other circuit parts CT1-CT4 are linked to the external test output TO, the external test mode selection input TMSO, the external test clock output TCKO and the external test input TI, in such a manner that the test mode selection inputs and test clock inputs TMS and TCK of the other circuit parts CT1-CT4 are connected together to the test mode selection input TMSO or test clock output TCKO of the processor circuit, or in other words are connected parallel, while for the test output TO or test input TI of the processor circuit and the test data inputs TDI or test data outputs TDO of the various circuit parts CT1-CT4, these elements are connected in series with the processor circuit.

The following test cases are possible: normal condition, production test and self-test.

In the normal condition, after the resetting of the processor core PC, for example by a power up reset, software or hardware reset of the processor core or a reset through an optional, special hardware reset of the test logic, the processor circuit is provided with a boundary scan in accordance with the aforementioned standard. In other words, instructions and data are input into the processor circuit and the processor circuit is thereupon activated. Carrying out the test and the output of the test result are also done in accordance with the aforementioned standard.

In the self-test, the test lines of the other circuit parts CT1-CT4 of the set of components are linked serially, which makes it possible for the processor core PC to stimulate the lines for the self-test through a parallel port, namely the port PORT. The processor core PC is constructed, for instance, in such a way that writing of the register cell T1 trips its own test operation, as a result of which a complete test of all of the connections of the set of components is possible. The port PORT stimulates all of the complementary outputs and inputs in comparison with the standard port. This means that the test output TO of the processor circuit is connected to the standard test input TDI, the test input TI of the processor circuit is connected to the standard test data output TDO, the test mode selection output TMSO of the processor circuit is connected to the standard test mode selection input TMS, and the test clock output TCKO of the processor circuit is connected to the standard test clock input TCK. As is shown in the exemplary embodiment, the further circuit parts CT1-CT4 are connected to the standard interface and tested by means of the processor circuit. The inputs of the componentry interface that likewise corresponds to the aforementioned standard, that is the test clock input TCK, test mode selection input TMS and the test data input TDI of the processor circuit, are disconnected within the processor circuit. The associated lines within the processor circuit are instead coupled to the corresponding input and output lines of the port PORT. To this end, register cells that can be written upon and read out in parallel are provided, in other words the register cells T3-T6, along with the associated multiplexers M2, M5, M6, M7, M8, M9 and demultiplexers D4, D5. The register cells T1-T6 substantially correspond to the cells of the boundary-scan registers BSR1-BSR5.

Instead of the internal test clock line TCKI and the internal test mode selection line TMS1, the test controller TAPC1 is respectively connected to the third and second output lines of the port PORT. The external test data output TO, the external test mode selection output TMSO, the external test clock output TCKO and the external test input TI are inactive during this phase. In processor circuits that have no internal data and program memories IMEM, the external bus EBUS must also be excluded from the test operation, specifically by means of the demultiplexer D2 and the multiplexer M4, in order to enable access to the external memory EPROM.

The processor core PC starts the self-test by setting a status word in the test control register TCR. Next, it writes a datum necessary for testing the other circuit parts CT1-CT4 and for the self-test, into a cell of the port PORT associated with the first output line. Simultaneously, the test mode selection signal for itself and for the other circuit parts CT1-CT4 is set. Subsequently, a clock pulse, generated by software or hardware, is output over the third output line of the port PORT. In the shift operations that then ensue for test operations, a test datum passes through the following circuit elements in order: the register cell T3; the other circuit parts CT1, CT2, CT4, CT3; the multiplexer M6; the register cell T6; the multiplexer M1; the demultiplexer D1; the boundary-scan register BSR1; the demultiplexer D2; the register cell T1, in the case of internal clock generation only; the multiplexer M3; the boundary-scan register BSR2; the demultiplexer D3; the boundary-scan register BSR3, only in the case of an internal test program memory; the multiplexer M4; the boundary-scan register BSR4; the demultiplexer D4; the register cell T2; the demultiplexer D5; the multiplexer M9; the boundary-scan register BSR5; the multiplexer M10; the multiplexer M5; and finally, the register cell T3. The outcome of the processor self-test can be read in the register cell T3, and the outcome of the test of the other circuit parts CT1-CT4 can be read in the register cell T6.

In the case of the production test, by suitably setting the instruction register INSTR2 through an external test data input TD1, the external test mode selection input TMS, the external test clock input TCK and the external test data output TDO, with the aid of the corresponding multiplexers and demultiplexers and decoder DEC2, the external test data input TDI is coupled to the external test output TO, the external test input TI is coupled to the external test data output TDO, and the external test clock input TCK is coupled to the external test clock output TCKO. The test mode selection inputs TMSO of the other circuit parts CT1-CT4 of the componentry continue to be stimulated by means of the external test mode selection output TMSO of the processor circuit. The external test mode selection output TMSO in turn is triggered through the additional test mode selection input TMSH. The latter, like the external test output TO, the external test mode selection output TMSO, the external test clock output TCKO and the external test input TI, is not used for the test of the processor circuit itself. Therefore, for simultaneously carrying out the processor self-test in the context of the production test, a special instruction is provided in the instruction register INSTR2, which differs from the instruction that is used in the normal condition.

The instructions listed in the aforementioned standard, such as bypass, sample preload, extest, intest or runbist, and optionally an instruction for reading the manufacturer register MAR, effect corresponding settings of the multiplexers M1-M14 and demultiplexers D1-D6 in the various operating modes. The self-test operating mode is set through the test control register TCR by the processor PC, and the production test operating mode is set through the instruction register INSTR2 by triggering the first test data input TDI, the external test clock input TCK, the external test mode selection input TMS and the external test data output TDO. The self-test operating mode can be valid only whenever the test controller TAPC2 and the instruction register INSTR2 are in such a condition that the data path beginning at the external test data input TDI leads to the external test data output TDO, through the demultiplexer D6, the instruction register INSTR2, the bypass register BYPR2, the test status register TSR or the test information register TIR, through the multiplexer M13 and finally through the multiplexer M14. These paths, together with the operating mode of the part of the processor circuit containing the test controller TAPC2, the decoder DEC2, the demultiplexer D6, the instruction register INSTR2, the bypass register BYPR2, the test status register TSR, the test information register TIR and the multiplexers M13 and M14, are set in the instruction register INSTR2. Since a collision is thus precluded, in these cases a self-test for the remaining part of the processor circuit can be set through the test control register TCR. In the production test, all of the types of instruction in the instruction register INSTR2 remain unchanged, but the data path is opened and bypassed with the aid of the demultiplexer D4 and the multiplexer M9. To this end, the set of instructions has been doubled, and an additional instruction for testing other circuit parts CT1-CTn of the set of components has been added. In the exemplary embodiment, n=4.

The additional test status register makes it possible to transfer information to the processor core through the internal bidirectional bus IBUS and through the test bus, which is connected to the test data input TDI, the test data output TDO, the test mode selection input TMS and the test clock input TCK. The test information register TIR enables the transfer of information to the processor core through the test bus. The course of the applicable data path is defined by the respective contents of the instruction register INSTR2, the test control register TCR and the instruction register INSTR1. If the instruction contents contradict one other, then the first in each case always prevails. The last one has the lowest priority. This assures that full control over the componentry can be taken over from outside at any time.

Advantageous properties of a processor circuit according to the invention are firstly that the circuit needs the structure defined in the standard in terms of the test data input TDI, the test data output TDO, the test mode selection input TMS and the test clock input TCK, or in other words with respect to the interface with the test bus, and secondly that a self-test of the componentry can be started both by the operating system of the processor circuit and by an external test device from outside through the test bus. Information on the individual tests to be carried out and the test results or the course of the tests can be exchanged through the test bus. It is additionally assured that the self-test can be stopped at any time, that the processor circuit can be reset through the test bus, and that an interrupt can also be tripped. The processor circuit according to the invention is especially well-suited for integration in microprocessors, microcomputers and microcontrollers, and it makes it possible to construct hierarchically testable complete systems including more than one set of components.

I claim:

1. A processor circuit, comprising:
   a processor core,
   a test control register connected to said processor core,
   an internal test clock line, an internal test mode selection line, a test controller connected to said internal test clock line and to said internal test mode selection line,
   an internal test data input line, a first demultiplexer having outputs and having an input connected to said internal test data input line,
   an instruction register having an input and an output, a bypass register having an input and an output, the inputs of said instruction register and said bypass register being connected to some of the outputs of said first demultiplexer,
   a decoder coupled to said instruction register, said test controller and said test control register,
   a multiplexer having inputs, the outputs of said instruction register and said bypass register being connected to some of the inputs of said multiplexer,
   a plurality of boundary-scan registers and register cells being connected in series between one of the outputs of said first demultiplexer and one of the inputs of said multiplexer, an external test clock output, an external test output, an external test input and a test mode selection output each being coupled to a respective one of said register cells,
   a port connected between said register cells and to said processor core, and
   an external test clock input, an external test mode selection input, an external test data input, an external test data output, an internal test data output line, and an additional external test mode selection input,
   a sequential circuit including further multiplexers and further demultiplexers,
   said sequential circuit being connected to said external test clock input, said external test mode selection input, said external test data input, said external test data output, said internal test data output line, said internal test clock line, said internal test mode selection line, said internal test data output line, said test controller, said first demultiplexer, said register cells, said port, said boundary-scan registers, said external test output and said external test input, in certain operating cases said sequential circuit decoupling elements in the form of said internal test clock line, said internal test mode selection line, said internal test data input line and said internal test data output line from said external test clock input, from said external test mode selection input, from said external test data input and from said external test data output, and coupling said elements to said external test clock output, to said test mode selection output, to said test input, and to said test output, and
   in certain operating cases said sequential circuit coupling said external test data input to said external test output, coupling said external test clock input to said external test clock output, coupling said external test input to said external test data output, and coupling said external test mode selection output to said additional external test mode selection input.

2. The processor circuit according to claim 1, including:
   an internal bidirectional bus, an internal processor reset line, an internal processor interrupt line and an internal processor clock line, each being connected to said processor core,
   said port being connected to said internal bidirectional bus and having input and output lines,
   a first one of said further multiplexers having one input coupled to said external test data input, another input connected to a first one of said input lines of said port, and an output side,
   said first demultiplexer being connected to the output side of said first multiplexer,
   a first one of said boundary-scan registers, said instruction register, said bypass register and a second one of said further multiplexers each having one input connected to a respective one of the outputs of said first demultiplexer, said second multiplexer having an output,
   said first boundary-scan register having an output side, a second demultiplexer of said further demultiplexers being connected to the output side of said first boundary-scan register, said second demultiplexer having outputs,
   a first register cell having a parallel input, a serial input, a parallel output and a serial output, an external clock input connected to the parallel input of said first register cell, one of the outputs of said second demultiplexer being connected to the serial input of said first register cell, said internal processor clock line being connected to the parallel output of said first register cell,
   a third one of said further multiplexers having one input connected to the serial output of said first register cell, another input connected to another of the outputs of the second demultiplexer and an output side,
   a second one of said boundary-scan registers being connected to the output side of said third multiplexer, and having an output side,
   a third demultiplexer of said further demultiplexers being connected to the output side of said second boundary-scan register, said third demultiplexer having outputs,
   an external bidirectional bus, a third one of said boundary-scan registers connected to one of the outputs of said third demultiplexer, to said external bidirectional bus and to said internal bidirectional bus, said third boundary-scan register having an output,
   a fourth one of said further multiplexers having one input connected to a further output of said third demultiplexer, another input connected to the output of said third boundary-scan register, and an output side, a fourth one of said boundary-scan registers connected to the output side of said fourth multiplexer, said fourth boundary-scan register having an output side, a fourth demultiplexer of said further demultiplexers being connected to the output side of said fourth boundary-scan register, said fourth demultiplexer having outputs, a second register cell having a parallel input connected to said additional external test mode selection input, a serial input connected to one of the outputs of said fourth demultiplexer, a serial output, and a parallel output, a fifth demultiplexer of said further demultiplexers being connected to the serial output of said second register cell, said fifth demultiplexer having a serial output and a further output, a fifth one of said further multiplexers having one input coupled to the serial output of said fifth demultiplexer, another input coupled to said internal test data output line, and an output, a third register cell having a serial input connected to the output of said fifth multiplexer, a parallel output connected to said external test output, a parallel input connected to the output of said second multiplexer and a serial output, said second multiplexer having an input connected to a first one of said output lines of said port, a fourth register cell having a serial input connected to a second one of said input lines of said port and to the serial output of said third register cell, a parallel output connected to said external test mode selection output, a serial output, and a parallel input, a fifth register cell having a serial input connected to the serial output of said fourth register cell, a parallel output connected to said external test clock output, and a parallel input, a sixth one of said further multiplexers having one input connected to said external test output, another input connected to said external test input, and an output, a sixth register cell having a serial input connected to the serial output of said fifth register cell, a parallel input connected to the output of said sixth multiplexer, and a parallel output connected to said first input line of said port, and a serial output, a ninth one of said further multiplexers having inputs being respectively connected to the serial output of said sixth register cell, to a further one of the outputs of said fourth demultiplexer, and to the further output of said fifth demultiplexer, and said ninth multiplexer having an output side, a seventh one of said further multiplexers having one input connected to the parallel output of said second register cell, another input connected to a second one of said output lines of said port, and an output connected to the parallel input of said fourth register cell, an eighth one of said further multiplexers having one input connected to said external test clock input, another input connected to a third one of said output lines of said port, and an output connected to the parallel input of said fifth register cell, a fifth one of said boundary-scan registers connected to the output side of said ninth multiplexer, said fifth boundary-scan register having an output, a tenth one of said further multiplexers having inputs being respectively connected to said first input line of said port, to the output of said fifth boundary-scan register, to the output of said instruction register, and to the output of said bypass register, and said tenth multiplexer having an output connected to said internal test data output line, an eleventh one of said further multiplexers having one input connected to said external test mode selection input, another input connected to the output of said seventh multiplexer, and an output, a twelfth one of said further multiplexers having one input connected to said external test clock input, another input connected to the output of said eighth multiplexer, and an output, said test controller having one input connected through said internal test mode line to the output of said eleventh multiplexer, another input connected through said internal test clock line to the output of said twelfth multiplexer, and an output, said test control register having an output, and unidirectional bus lines connecting said decoder to the outputs of said test control register, said test controller and said instruction register, for triggering said demultiplexers, said multiplexers, said boundary-scan registers, and said register cells.

3. The processor circuit according to claim 2, including a sixth demultiplexer of said further demultiplexers having an input connected to said external test data input and a thirteenth one of said further multiplexers being connected to said sixth demultiplexer and having an output connected to the one input of said first multiplexer, for coupling together said external test data input and the one input of said first multiplexer, said thirteenth multiplexer having inputs and an output, and said sixth demultiplexer having outputs, one of the outputs of said sixth demultiplexer being directly connected to one of the inputs of said thirteenth multiplexer, a further instruction register, a further bypass register, a test status register and a test information register each being connected between a respective one of the outputs of said sixth demultiplexer and a respective one of the inputs of said thirteenth multiplexer, said test status register and said test information register being additionally connected to said internal bidirectional bus, a further test controller having one input connected to said external test clock input and another input connected to said external test mode selection input, a further decoder having inputs and outputs, unidirectional bus lines connecting the inputs of said further decoder to said further instruction register, to said further test controller and to said further test control register, the outputs of said further decoder being connected to said internal processor reset line, to said internal processor interrupt line and to said internal test logic reset line, and a fourteenth one of said further multiplexers being connected between said external test data output and said internal test data output line, said fourteenth multiplexer having one input connected to said internal test data output line, another input connected to the output of said thirteenth multiplexer, and an output connected to said internal test data output line.

4. The processor circuit according to claim 3, including control lines connecting said further decoder to said first-mentioned decoder as well as to said thirteenth and fourteenth multiplexers and to said sixth demultiplexer.

5. The processor circuit according to claim 2, including an internal data and program memory connected to said internal bidirectional bus.

6. The processor circuit according to claim 2, wherein said first demultiplexer has a further output, said tenth multiplexer has a further input, and including a manufacturer register connected between the further output of said first demultiplexer and the further input of said tenth multiplexer.

7. The processor circuit according to claim 3, wherein the contents of said first-mentioned instruction register have a lower priority than those of said test control register, and the contents of said test control register in turn have a lower priority than those of said further instruction register.

* * * * *